Aug. 25, 1936.    J. B. R. SAVARY    2,052,253
DEVICE FOR THE PRODUCTION OF YAOURT OR THE LIKE
Filed Oct. 5, 1931
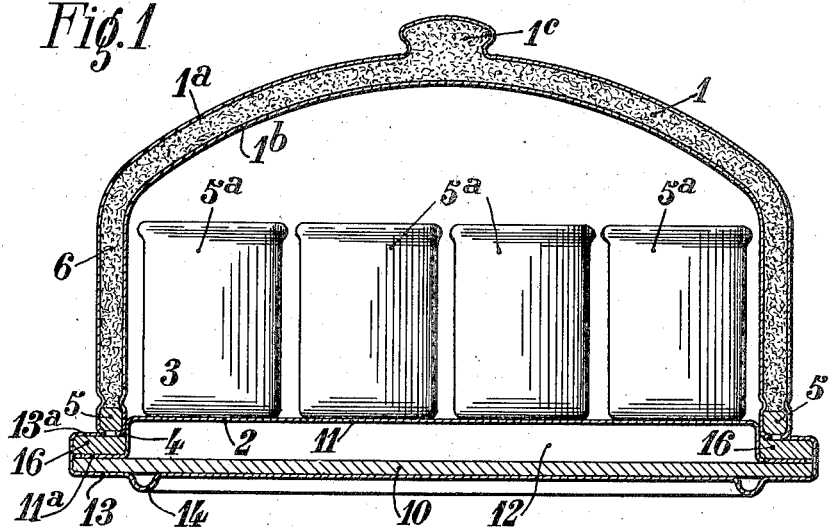
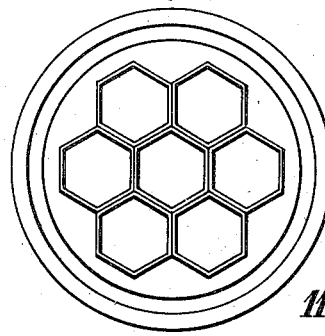
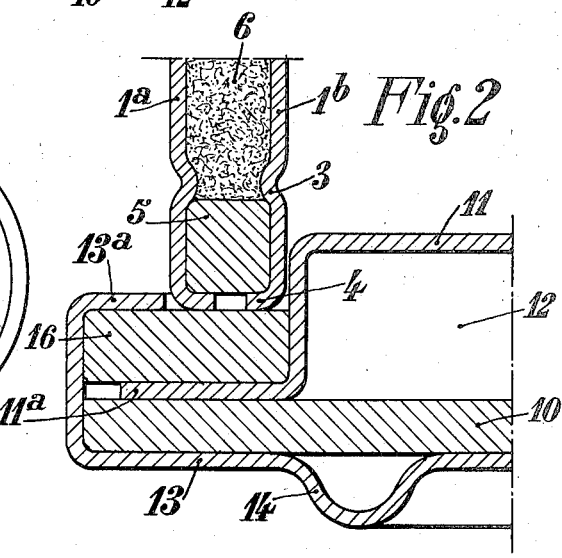
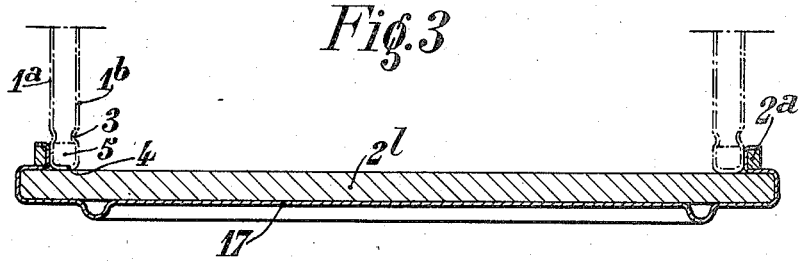
J. B. R. Savary
INVENTOR
By: Marks & Clerk
ATTYS.

Patented Aug. 25, 1936

2,052,253

UNITED STATES PATENT OFFICE 2,052,253

DEVICE FOR THE PRODUCTION OF YAOURT OR THE LIKE

Jean Baptiste Raoul Savary, Paris, France

Application October 5, 1931, Serial No. 567,077
In France December 3, 1930

1 Claim. (Cl. 65—59)

The present invention has for object a method and devices for the production of yaourt or the like.

Generally speaking, for manufacturing yaourt, milk is concentrated by slowly or rapidly heating it and, when it has cooled down to a suitable temperature (about 40 to 50° C.), a special ferment (Maya), or yaourt made the day before, is incorporated thereinto. The milk thus treated is slowly brought back to the surrounding temperature, during a period varying from seven to twenty hours, according to the different methods of treatment employed.

The slow cooling which constitutes the last operation of the treatment, is extremely delicate. Actually, this cooling is effected in stoves, the source of heat of which is progressively reduced. Such a procedure necessitates the use of a source of heat and of adjusting or controlling means.

In order to remedy these inconveniences, it has been proposed to store the milk treated in vessels having athermanous walls. This solution does not give entire satisfaction, as it necessitates, for each portion of yaourt, a special vessel which is fragile and costly.

The present invention has for object to remedy the above mentioned inconveniences, and the method of manufacture of yaourt forming the subject-matter of the said invention is characterized in that the product, heated to about 50° C. in ordinary vessels, is protected against loss of heat by inserting these vessels in an enclosure having walls which are non-conductors of heat, so that the cooling down to the surrounding temperature should take place in about three hours.

The invention has for further object an enclosure which is nonconductor of heat, for carrying out the process, this enclosure being provided with a parabolic inner wall for correctly reflecting heat on the treated product.

The invention has also for object means for carrying out the method previously set forth; these means, which are extremely variable, are all included in the scope of the invention. A form of construction of an enclosure which is nonconductor of heat, for the manufacture of yaourt, is mainly characterized in that it is constituted by a bell comprising two walls made of any suitable materials and isolated from each other for forming a chamber enclosing a non-conducting material, this removable bell resting on a non-conducting support on which the vessels containing yaourt are placed.

The invention has for further object a special form of construction of the vessels containing yaourt and of the enclosure.

The accompanying drawing illustrates, by way of example only, forms of construction of a non-conducting enclosure according to the invention.

Figure 1 is an elevation in axial section.

Figure 2 is a partial section on an enlarged scale.

Figure 3 is an axial section of a constructional modification of a tray which can be used in combination with the bell illustrated in Fig. 1.

Figure 4 is a plan view of a constructional modification, the bell being removed.

The non-conducting enclosure illustrated in Fig. 1 comprises a removable bell 1 which rests on a non-conducting tray 2 on which the vessels 5$^a$ containing yaourt are placed.

The bell is constituted by two walls 1$^a$ and 1$^b$ attached at 3 and 4 to a non-conducting crown 5 (made of cork, bakelite or the like). The chamber separating both walls is filled with a suitable non-conducting material 6. The casing 1$^a$ is preferably provided, at its upper part, with a gripping knob 1$^c$.

The tray 2 is made in the same way as the bell.

In the form of construction illustrated in Fig. 1, the tray 2 is provided with a plate 10, made of cardboard for instance, on which is secured a metal support 11 in the shape of an inverted bowl, so as to constitute an air chamber 12. A metal casing 13 having an embossed portion 14 forming a bearing bead, is peripherally bent down to hold the support 11 against the plate 10, the edge 13$^a$ of the casing clamping the edge 11$^a$ of the support with interposition of a non-conducting ring 16 made of any suitable material. It will be seen that the casing 13 is thermally isolated from the support 11.

The inner wall 1$^b$ of the bell touches the support 11, and the outer wall 1$^a$ comes in contact with the casing 13.

An enclosure (bell and tray) is thus obtained, this enclosure having an inner wall (1$^b$ and 11) and an outer wall (1$^a$ and 13).

Besides, it will be noted that, according to the invention, the walls 1$^a$ and 1$^b$ are perfectly polished. The polishing of 1$^b$ is given a high finish for constituting a reflector for the calorific rays.

Figure 3 illustrates a constructional modification of a tray 2 which, in this case, comprises a plate 2$^1$, made of cork or like material, and reinforced by a metal sheet 17, forming together, with a suitable ring, a ledge 2$^a$.

The tray might be simply constituted by a non-conducting plate.

The applicant has found that a non-conducting enclosure, made as previously set forth, allows slow cooling of yaourt placed in the vessels 5, the period of cooling corresponding to the desired time.

It will also be noted that the method according to the invention and the apparatus described for carrying it into practice allow one to obtain yaourt of excellent quality in a relatively reduced time.

In fact the applicant has found that the period of treatment in the non-conducting enclosure does not substantially exceed three hours, thus reducing by half the time actually necessary for obtaining yaourt of the same quality by the methods previously known.

The apparatus described ensure the treatment of very variable quantities of yaourt and this allows the said apparatus, according to their dimensions, to be used either by manufacturers, or by private individuals for their own use.

Figure 4 is a plan view of a form of construction in which the vessels 5ª are of hexagonal shape, thus allowing reduction of the space occupied by the apparatus.

It is obvious that the form of construction described and illustrated is only a simple example capable of receiving numerous modifications which, as long as they do not alter in any way the main features above set forth and the result desired, remain included in the scope of the present invention.

What I claim as my invention and desire to secure by Letters Patent is:—

In an apparatus for the manufacture of yaourt, in combination; a bell having athermanous walls constituted by an inner polished metallic wall, an outer polished metallic wall and a heat-insulating material separating the two metallic walls which have no point of contact, a base having athermanous walls constituted by a polished metallic wall situated entirely outside the enclosure or space limited by the bell and its base, a second metallic wall projecting into the interior of the enclosure or space and a heat-insulating material separating the two metallic walls which have not point of contact, the said heat-insulating material appearing in the annular supporting region of the bell for constituting an air-tight joint between the bell and the base.

JEAN BAPTISTE RAOUL SAVARY.